(12) United States Patent
Edmonds

(10) Patent No.: US 12,432,193 B1
(45) Date of Patent: Sep. 30, 2025

(54) TRANSFORMED LINK FOR AUTOMATICALLY PROVIDING ACCESS OF A PROTECTED RESOURCE ACCESSIBLE TO A DIFFERENT INSTANCE

(71) Applicant: ServiceNow, Inc., Santa Clara, CA (US)

(72) Inventor: James Robert Edmonds, Franklin, TN (US)

(73) Assignee: ServiceNow, Inc., Santa Clara, CA (US)

( * ) Notice: Subject to any disclaimer, the term of this patent is extended or adjusted under 35 U.S.C. 154(b) by 78 days.

(21) Appl. No.: 18/617,128

(22) Filed: Mar. 26, 2024

(51) Int. Cl.
*G06F 7/04* (2006.01)
*H04L 9/40* (2022.01)
*G06F 9/54* (2006.01)

(52) U.S. Cl.
CPC .......... *H04L 63/0815* (2013.01); *G06F 9/547* (2013.01)

(58) Field of Classification Search
CPC ..... G06F 21/35; G06F 21/335; H04L 9/0866; H04L 63/0815; H04L 63/0876; H04L 63/10
See application file for complete search history.

(56) References Cited

U.S. PATENT DOCUMENTS

| | | | |
|---|---|---|---|
| 9,413,750 B2 * | 8/2016 | Akula | H04L 67/02 |
| 11,044,257 B1 * | 6/2021 | Heuts | H04L 63/108 |
| 2011/0265172 A1 * | 10/2011 | Sharma | H04L 63/0815 |
| | | | 726/8 |
| 2013/0014243 A1 * | 1/2013 | Chen | H04L 67/561 |
| | | | 726/8 |
| 2017/0249394 A1 | 8/2017 | Loeb | |
| 2019/0391959 A1 | 12/2019 | Niu | |
| 2021/0099449 A1 | 4/2021 | Frederick | |
| 2022/0366410 A1 | 11/2022 | Rule | |
| 2022/0413879 A1 | 12/2022 | Passey | |

OTHER PUBLICATIONS

Hossain et al, OAuth-SSO: A Framework to Secure the OAuth-Based SSO Service for Packaged Web Applications, IEEE, Aug. 3, 2018, pp. 1575-1578. (Year: 2018).*
Beltran, Characterization of Web Single Sign-On Protocols, IEEE, Jul. 15, 2016, pp. 24-30. (Year: 2016).*
International Search Report and Written Opinion, PCT Application PCT/US2025/015470, mailed May 28, 2025.

* cited by examiner

*Primary Examiner* — Philip J Chea
*Assistant Examiner* — Jenise E Jackson
(74) *Attorney, Agent, or Firm* — McDonnell Boehnen Hulbert & Berghoff LLP

(57) ABSTRACT

In the present application, improved techniques of a provider instance providing a customer instance access to resources on an ITSM platform are disclosed. A link to a protected resource is generated by a first instance. In response to determining that the link is being transmitted to a user of a second instance different from the first instance, the link is converted into a transformed link comprising an application programming interface (API) call. In response to the user of the second instance interacting with the transformed link, the API call is received. Based on the API call, it is determined that the user is authorized to access the protected resource. In response to determining that the user is authorized to access the protected resource, the user of the second instance is provided a uniform resource locator (URL) to access a time-based single sign-on (SSO) page for accessing the protected resource.

19 Claims, 19 Drawing Sheets

FIG. 16

TRANSFORMED LINK FOR AUTOMATICALLY PROVIDING ACCESS OF A PROTECTED RESOURCE ACCESSIBLE TO A DIFFERENT INSTANCE

BACKGROUND OF THE INVENTION

A service request refers to a formal request from a user or a group of users for information, a new service, or for access to an existing service or resource within an organization. Service requests may be submitted through a service request platform, which serves as an information technology service management (ITSM) platform.

For example, a user/consumer may submit service requests through a self-service portal or other designated channels. Once a service request is submitted, it is typically routed to the appropriate support team or individual responsible for handling that particular type of request. The responsible support team or individual is referred to as the provider. The assigned support team or individual reviews the service request and takes necessary actions to fulfill it. This may involve providing information, granting access to resources, or performing other tasks as requested. Throughout the process, the ITSM tool may allow for tracking and communication regarding the status of the service request. The user may monitor the progress of the requests and receive updates as necessary. Once the service request has been fulfilled, the support team or individual marks it as resolved and closes the request in the ITSM tool.

Service requests can encompass a wide range of items, such as software installations, hardware requests, access permissions, account provisioning, and more. The ITSM tool provides a structured and efficient way for organizations to manage and track these requests, thereby improving service delivery and user satisfaction.

BRIEF DESCRIPTION OF THE DRAWINGS

Various embodiments of the invention are disclosed in the following detailed description and the accompanying drawings.

FIG. 16 illustrates that if the consumer user submits the item, then a provider task will be created back in the consumer instance to track its progress.

DETAILED DESCRIPTION

Figure 1A:
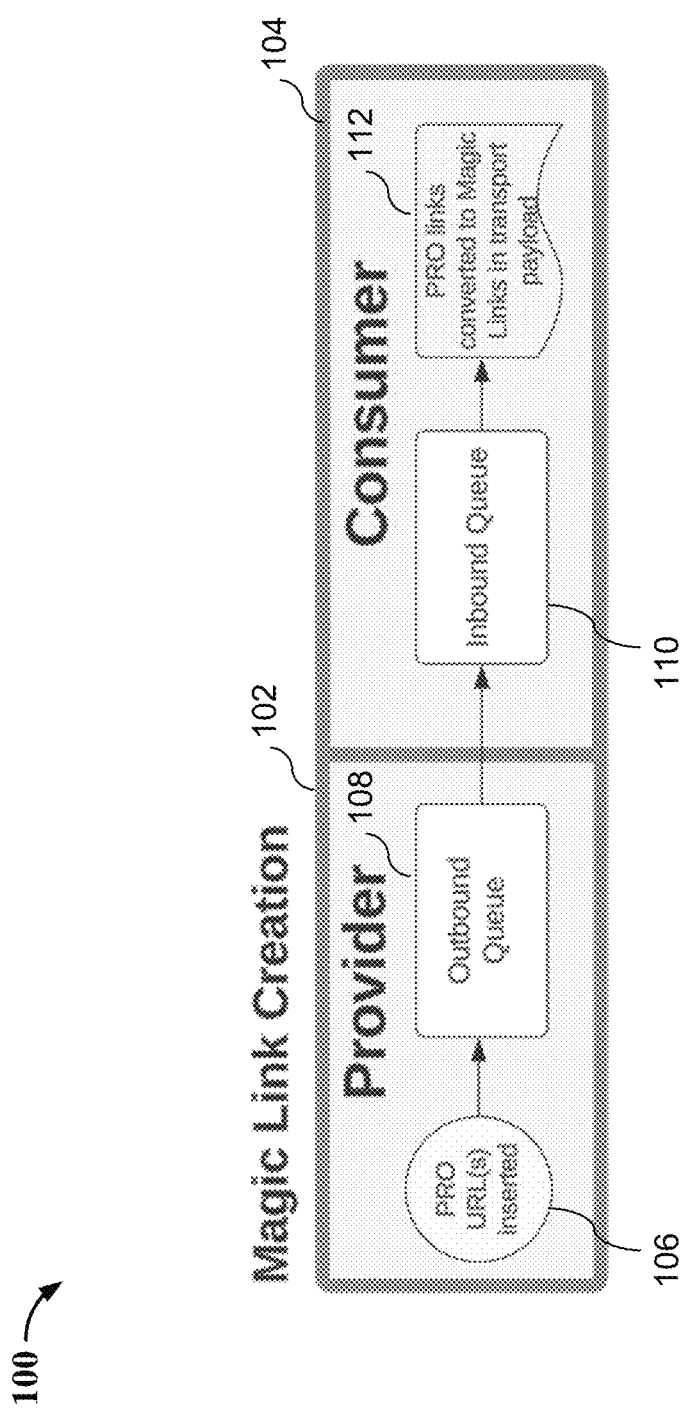
FIG. 1A illustrates an exemplary process 100 for creating a consumer-side access link (Magic Link) that may be used in a consumer instance to access a resource that is accessible by a regular link in a provider instance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In an ITSM platform, a consumer who issues the service request may use a consumer application. As a provider, the assigned support team or virtual agent for a service request may use a provider application. The consumer application and the provider application help consumers and providers connect and track service requests directly between their application instances. Consumers and providers can both work in their own environments without having to configure and maintain custom integrations.

For example, a virtual agent may run a provider instance that allows the agent to work with multiple different partners and their associated consumers. And the consumers working with the virtual agent may each run their own consumer instances. Each consumer instance may also be connected with other provider instances.

In various situations, a virtual agent provides a user certain information. For example, the virtual agent may provide an article (e.g., a knowledge base (KB) article) to the user. A knowledge base article is a piece of online documentation that answers a frequently asked question (FAQ) or provides instructions for solving a problem that customers commonly run into. Common knowledge base article types include informational articles, how-tos, troubleshooting guides, FAQs, and the like. To share the knowledge base article, the virtual agent may post a hyperlink to the KB article in a chat. A hyperlink, or simply a link, is a digital reference to data that the user can follow or be guided to by clicking or tapping. A hyperlink points to a whole document or to a specific element within a document. In some instances, the KB article may be a protected resource that is only accessible to authorized users, such as users that are logged into their accounts. When the user is not logged into the account, the hyperlink may lead the user to an error page or redirect the user to a log-in page.

The current disclosure is aimed at improving sharing of protected resources between a provider instance and an external instance. In particular, a regular link to a protected resource sent from a provider instance is automatically transformed into an external access link (also referred to as a Magic Link or transformed link). The external access link, which when clicked by a user at the external instance, automatically logs the user of the external instance into the provider instance and leads the user to the protected resource.

In some implementations, when the Magic Link is activated (i.e., clicked by a user), a process is triggered to validate that the user is an authorized user on the connection. For example, an API call is sent to the provider instance with information identifying the user and/or the external instance. When the provider instance validates the user, the provider instance returns a uniform resource locator (URL) to access a time-based single sign-on (SSO) page for accessing the protected resource (also referred to as an SSO URL). The SSO URL may only be available for a predetermined amount of time (i.e., the user may have time-limited access to the protected resource). In some implementations, the Magic Link cannot be saved and can only be used to access the protected resource a single time.

In the present application, improved techniques of a provider instance providing a customer instance access to resources on an ITSM platform are disclosed. A regular link sent from a provider instance is automatically transformed by a consumer instance into a consumer-side access link (also referred to as a Magic Link or transformed link), which when clicked logs the consumer user into the provider instance and leads the consumer user to the resource linked by the regular link.

When a link is transmitted from the provider instance and to a consumer instance, it is transformed into a consumer-side access link (also referred to as a Magic Link or transformed link). In some implementations, the link is transformed into a magic link by a conversion module. The conversion module may be implemented on the provider instance, the consumer instance, or some combination of the two. For example, the conversion module can access each message in an outbound queue of the provider instance. In another example, the conversion module accesses each message in an inbound queue of the consumer instance. In either example, the consumer module can then convert any link to a magic link.

Once the magic link is received at the consumer instance and activated (i.e., a user at the consumer instance clicks the magic link), a process is triggered to validate that the user is an authorized user on the connection, and to make a callback over to the provider instance. For example, upon activating the magic link an API call may automatically be sent to the provider instance including information about the user and/or the consumer instance. In response, the provider instance validates that the consumer user may access the resource and generates a one-time-use link for the consumer user to access the resource within a predetermined amount of time. The consumer user is redirected to the one-time-use link, which allows the consumer user to access the resource within the predetermined period of time. The one-time-use link cannot be saved and can be used only a single time.

The improved techniques have many benefits. The transformed links solve the different issues that occur when providers and consumers work in their own instances. These issues include, but are not limited to, reduced task deflection and loss of access to resources in the provider instance, including KB articles, complex catalog orders, virtual assistant, and the like. The transformed links solve the issues by allowing the provider to offer these resources from its instance directly to the consumer in the consumer instance. The transformed links are available in real-time and automatically log the user in and take the user to the resources linked. The transformation is transparent to the user. From the user's perspective, a link is clicked and the resource is automatically available to the user.

In some embodiments, the two instances may be owned by different companies that would not usually have SSO configured between their instances. The SSO mechanism used in the present application works even in these cases where a single provider company could have thousands of their customers' instances connected to it.

In the present application, improved techniques of a provider instance providing a customer instance access to resources on an ITSM platform are disclosed. A link to a protected resource is generated by a first instance. In response to determining that the link is being transmitted to a user of a second instance different from the first instance, the link is converted into a transformed link comprising an application programming interface (API) call. In response to the user of the second instance interacting with the transformed link, the API call is received. Based on the API call, it is determined that the user is authorized to access the protected resource. In response to determining that the user is authorized to access the protected resource, the user of the second instance is provided a uniform resource locator (URL) to access a time-based single sign-on (SSO) page for accessing the protected resource.

FIG. 1A illustrates an exemplary process 100 for creating a consumer-side access link (Magic Link) that may be used in a consumer instance to access a resource that is accessible by a regular link in a provider instance. Process 100 includes a provider instance 102 and a consumer instance 104 connected to each other. At 106, provider instance links are inserted into the provider instance. A provider instance link may include a hyperlink and an associated uniform resource locator (URL). The link is a clickable element on a webpage that directs users to another resource, for example by using a URL. A URL is a specific type of identifier that specifies the location of a resource on the Internet. It is an address that points to a particular web page, file, or resource.

At 108, the provider instance links are sent to an outbound queue. Information or data that is sent from the provider instance to a consumer instance is serialized and put into the outbound queue of the provider instance.

At 110, the provider instance links sent from the outbound queue are received by the inbound queue of the consumer instance. For example, an original link for accessing a protected resource accessible to an authorized user on the provider instance is received by the consumer instance. At 112, the provider instance links are converted to consumer-side access links in the transport payload. The provider instance links are converted at the transport level.

Figure 1B:
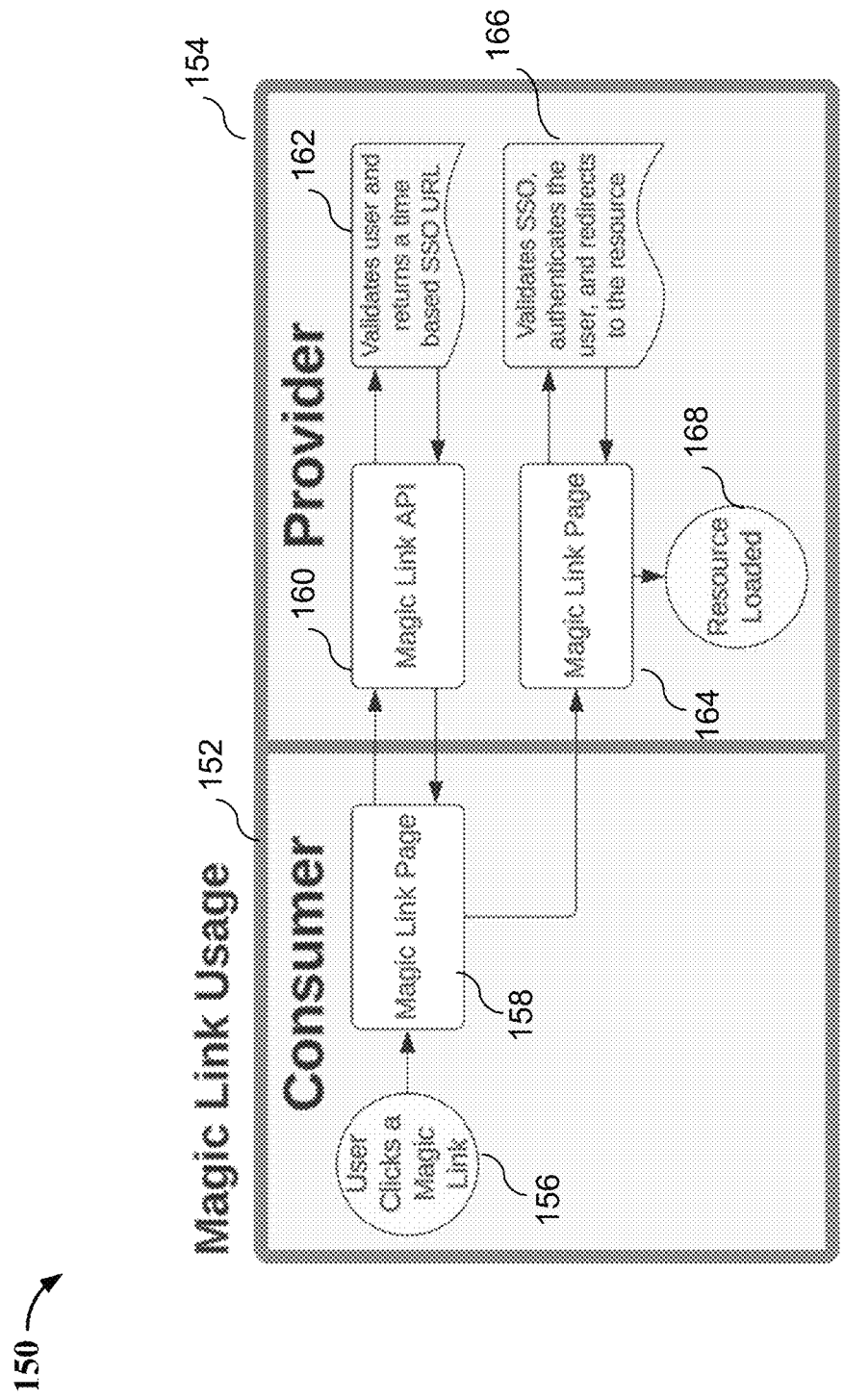
FIG. 1B illustrates an exemplary process 150 for a consumer user to use the consumer-side access link.

FIG. 1B illustrates an exemplary process 150 for a consumer user to use the consumer-side access link. Process 150 includes a consumer instance 152 and a provider instance 154 connected to each other. At 156, a consumer-side access link is clicked by a consumer user running consumer instance 152. A request by the consumer user to access a protected resource is received. Magic Link page 158 on the consumer side points at an application programming interface (API) on the provider side, and when the consumer user clicks on the link, the page calls Magic Link API 160 over on provider instance 154. At 162, in response to the API being called, the consumer user is validated and a time-based single sign-on (SSO) URL that points to a Magic Link page 164 on the provider side is returned. The returned SSO URL is time-based. For example, a predetermined period is five minutes and the SSO URL only works for one click. Magic Link page 158 redirects to Magic Link page 164 on the provider side. At 166, the SSO URL is validated and the consumer user is authenticated. In addition, the consumer user is being redirected to the resource. At 168, the resource is loaded and becomes accessible by the consumer user.

Figure 2A:
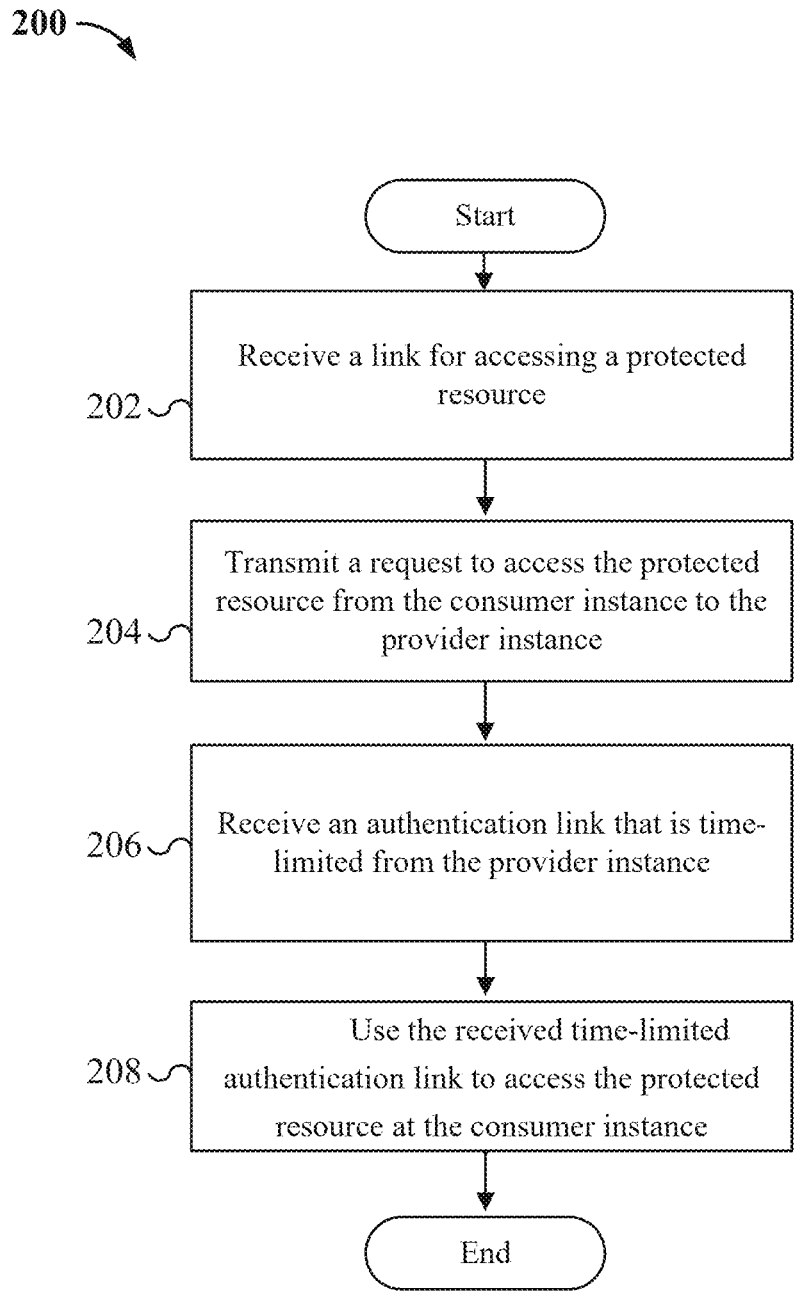
FIG. 2A illustrates another exemplary process 200 of a consumer instance obtaining access to resources from a provider instance on an ITSM platform.

FIG. 2A illustrates another exemplary process 200 of a consumer instance obtaining access to resources from a provider instance on an ITSM platform. In some embodiments, process 200 may be performed as at least a part of process 100 in FIG. 1A and at least a part of process 150 in FIG. 1B.

At 202, a link for accessing a protected resource is received by the consumer instance. The protected resource is accessible to an authorized account on a provider instance that is different from the consumer instance. In some embodiments, this step may be performed as part of step 110 of process 100 in FIG. 1A. The provider instance links sent from the outbound queue 108 are received by the inbound queue 110 of the consumer instance. For example, an original link for accessing a protected resource accessible to an authorized user on the provider instance is received by the consumer instance.

At 204, a request to access the protected resource is transmitted from the consumer instance to the provider instance. In some embodiments, this step may be performed as part of process 150. A consumer-side access link is clicked by a consumer user running consumer instance 152. Magic Link page 158 on the consumer side points at an application programming interface (API) on the provider side, and when the consumer user clicks on the link, the page calls Magic Link API 160 over on provider instance 154.

At 206, an authentication link that is time-limited is received at the consumer instance from the provider instance. In response to the API being called, the consumer user is validated and a time-based single sign-on (SSO) URL that points to a Magic Link page 164 on the provider side is returned from the provider instance to the consumer instance. The returned SSO URL is time-based, for example, a predetermined period is five minutes. The SSO URL only works for one click.

At 208, the received time-limited authentication link is used to access the protected resource at the consumer instance. Magic Link page 158 redirects to Magic Link page 164 on the provider side. The SSO URL is validated and the consumer user is authenticated. In addition, the consumer user is being redirected to the resource. The resource is loaded and becomes accessible by the consumer user.

Figure 2B:
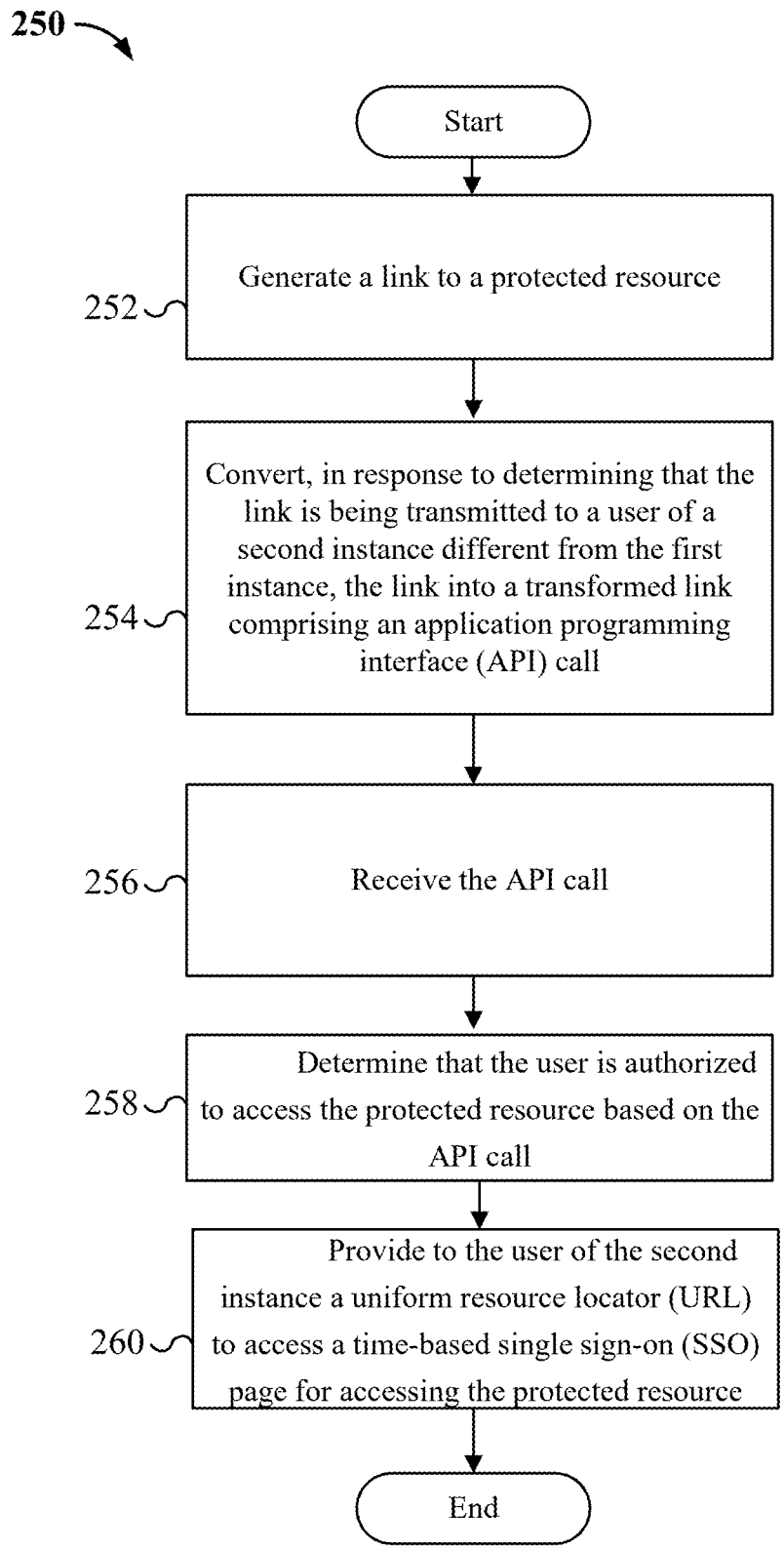
FIG. 2B illustrates another exemplary process 250 of a provider instance providing a customer instance access to resources on an ITSM platform.

FIG. 2B illustrates another exemplary process 250 of a provider instance providing a customer instance access to resources on an ITSM platform. In some embodiments, process 250 may be performed as at least a part of process 100 in FIG. 1A and at least a part of process 150 in FIG. 1B.

At 252, a link to a protected resource is generated by a provider instance. For example, a provider instance link is generated and sent to an outbound queue, as shown in process 100. Information or data that is sent from the provider instance to a consumer instance is serialized and put into the outbound queue of the provider instance.

At 254, it is determined that the link to the protected resource is being transmitted to a user of a consumer instance that is different from the provider instance. The link is converted to a transformed link that comprises an application programming interface (API) call. In some embodiments, the link is converted to a transformed link by a conversion module. The conversion module may be implemented to facilitate communications between the provider instance and the consumer instance. Accordingly, the conversion module can scan messages at either an outbound queue of the provider instance, an inbound queue of the consumer instance, or any combination thereof. The conversion module can then transform any link to a magic link. For example, as shown in process 100 at 110, the provider instance link is transmitted from the outbound queue and received by the inbound queue of the consumer instance. At 112, the provider instance link is converted to a transformed link in the transport payload. In some embodiments, the link is converted to a transformed link by the conversion module of the provider instance, prior to the link being received at the consumer instance. Alternatively, the conversion module can convert the link to the transformed link once the link is received at the consumer instance.

At 256, the API call is received by the provider instance. After the user of the consumer instance interacts with the transformed link (e.g., by clicking the transformed link), the API call is received by the provider instance. For example, as shown in process 150 at 156, the transformed link is clicked by a consumer user running consumer instance 152. Magic Link page 158 on the consumer side points at an application programming interface (API) on the provider side. When the consumer user clicks on the link, the page calls Magic Link API 160 over on provider instance 154, and the API call is received by the provider instance.

At 258, it is determined that the user is authorized to access the protected resource. The determination is based on the API call. For example, as shown in process 150 at 162, in response to the API being called, the consumer user is validated.

At 260, after it is determined that the user is authorized to access the protected resource, the user of the consumer instance is provided a uniform resource locator (URL) to access a time-based single sign-on (SSO) page for accessing the protected resource. The time-based single sign-on (SSO) URL pointing to a Magic Link page 164 on the provider side is returned. The returned SSO URL is time-based. For example, a predetermined period is five minutes. And the SSO URL only works for one click. Magic Link page 158 redirects to Magic Link page 164 on the provider side. At 166, the SSO URL is validated and the consumer user is authenticated. In addition, the consumer user is being redirected to the resource. At 168, the resource is loaded and becomes accessible by the consumer user.

Figure 3:
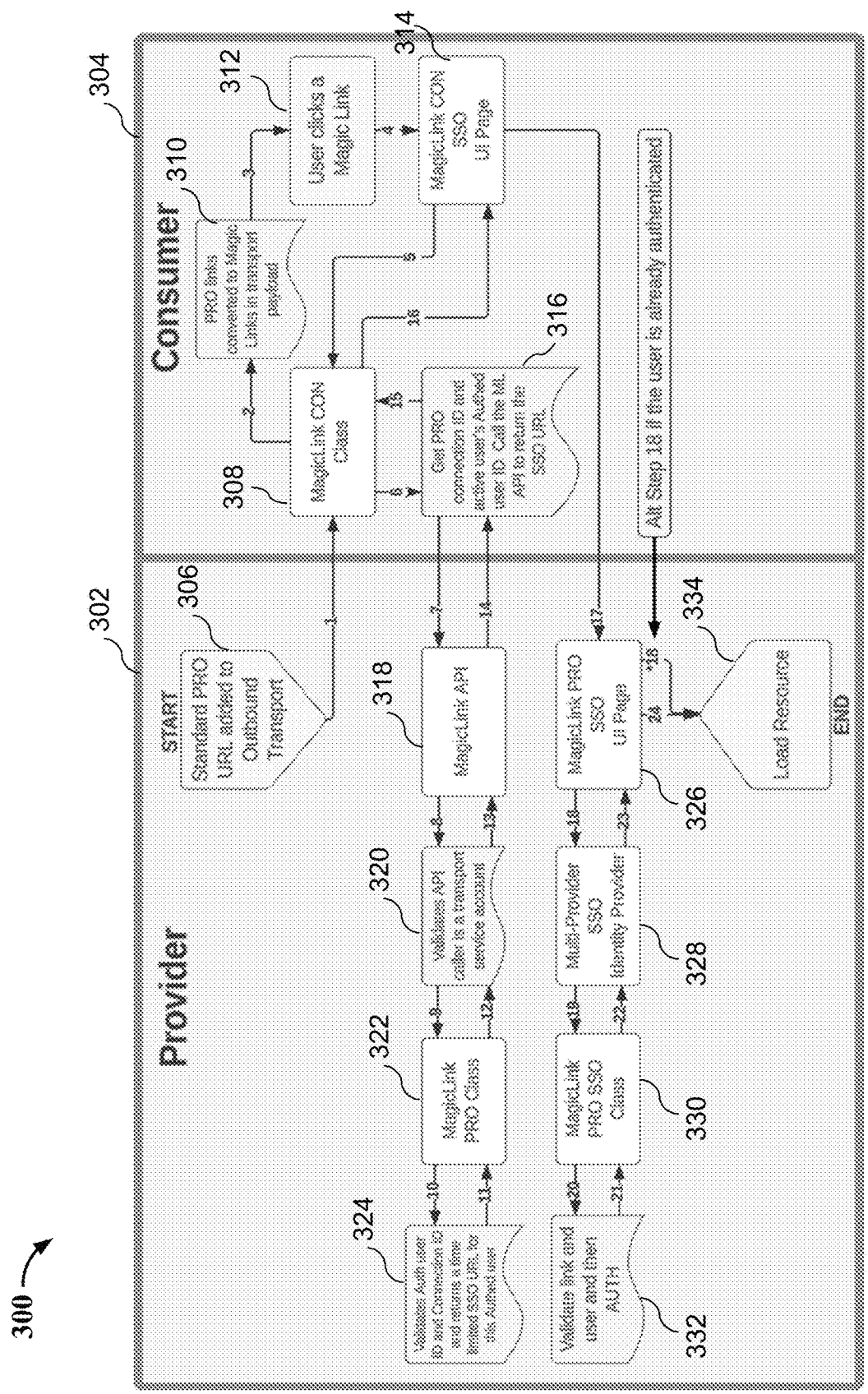
FIG. 3 illustrates another exemplary process 300 for a consumer user to use the consumer-side access link.

FIG. 3 illustrates another exemplary process 300 for a consumer user to use the consumer-side access link. In some embodiments, process 300 may be performed as at least a part of process 100 in FIG. 1A and at least a part of process 150 in FIG. 1B. Process 300 includes a consumer instance 304 and a provider instance 302 connected to each other.

FIGS. 4 to 13 illustrate exemplary screenshots of one example (Example A) of a virtual agent communicating and working with a consumer user. In this example, a regular link to a resource sent from the provider is sent to the consumer instance and automatically transformed into a Magic Link, which enables the consumer to log into the provider instance as himself and be taken to the resource. This particular example is used to illustrate at least some of the steps in process 300. However, it should be recognized that process 300 is not limited to this particular example alone.

Figure 4:
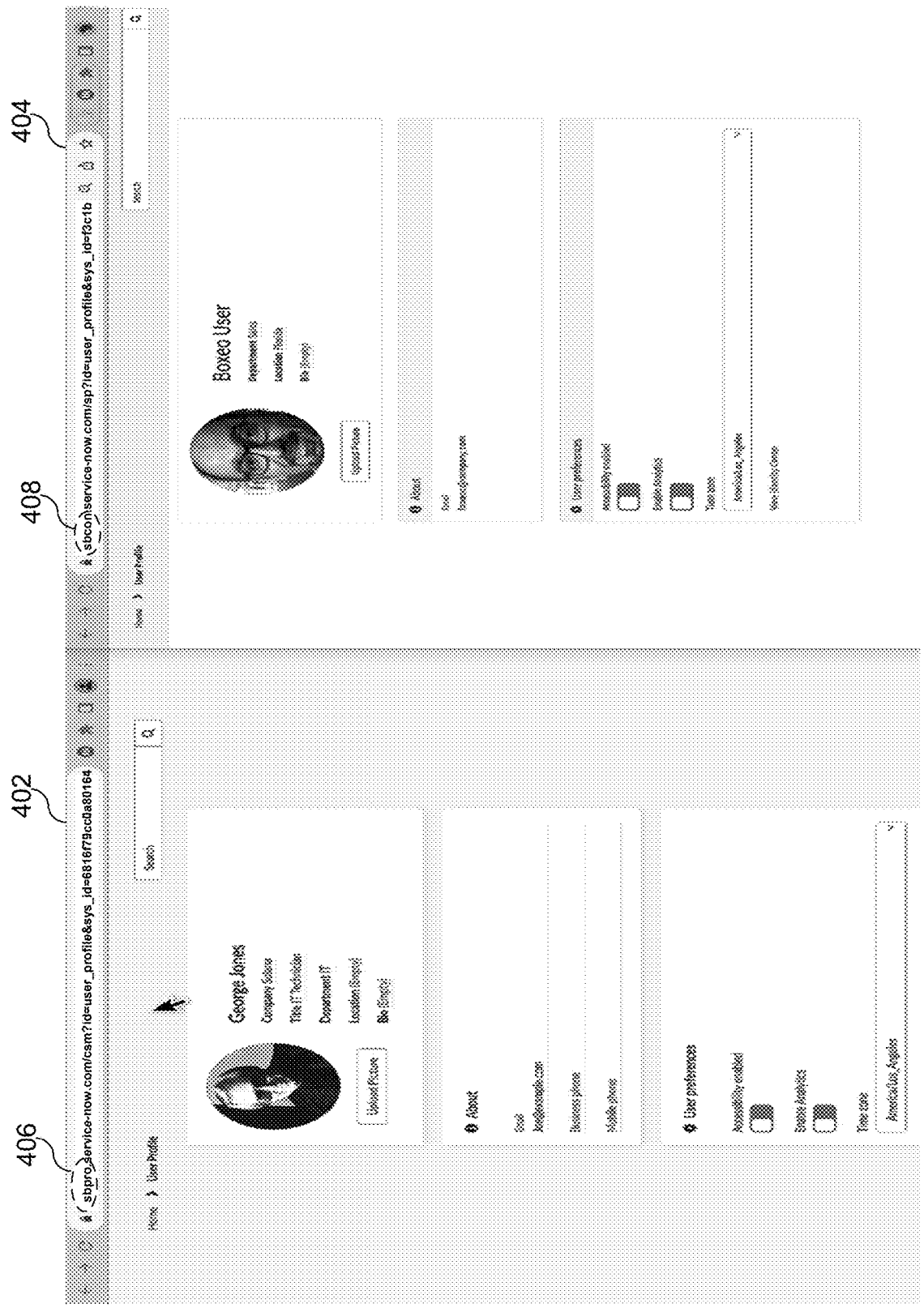
FIG. 4 illustrates the screenshots of a virtual agent communicating and working with a consumer user on an IT issue.

FIG. 4 illustrates the screenshots of a virtual agent communicating and working with a consumer user on an IT issue. Screenshot 402 shows the virtual agent running a provider instance (indicated as "sbpro" 406) that allows the agent to work with multiple different partners and their associated consumers. Screenshot 404 shows one of the consumer users working with the virtual agent and running a consumer instance (indicated as "sbcon" 408).

Figure 5:
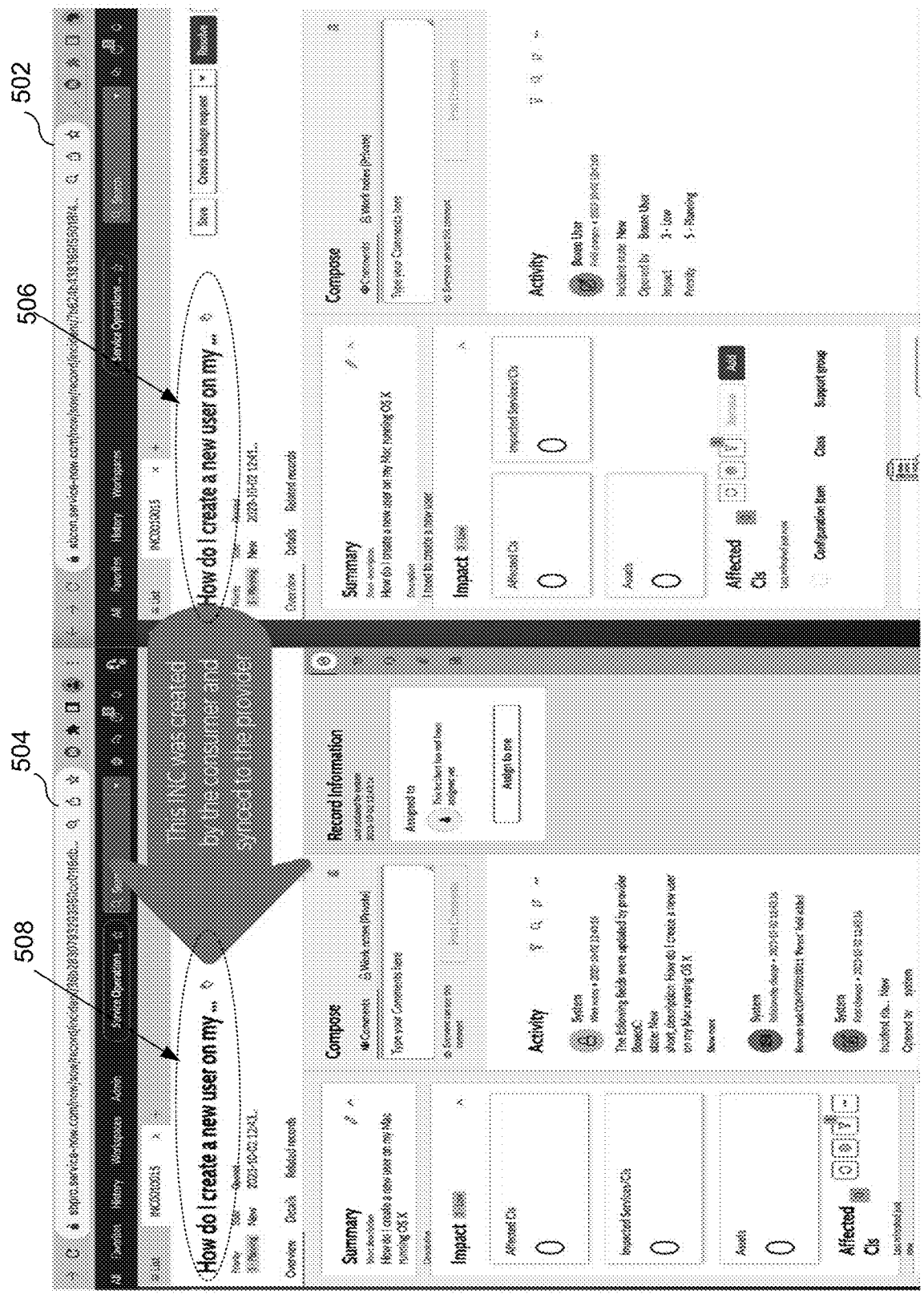
FIG. 5 illustrates the screenshot of the consumer user creating a new incident (INC) and the screenshot of the virtual agent receiving notification of the incident.

FIG. 5 illustrates the screenshot of the consumer user creating a new incident (INC) and the screenshot of the virtual agent receiving notification of the incident. Screenshot 502 shows that the consumer user has created a new incident record "How do I create a new user on my Mac running OS X" 506. Screenshot 504 shows that the incident record 508 is sent to the virtual agent.

Figure 6:
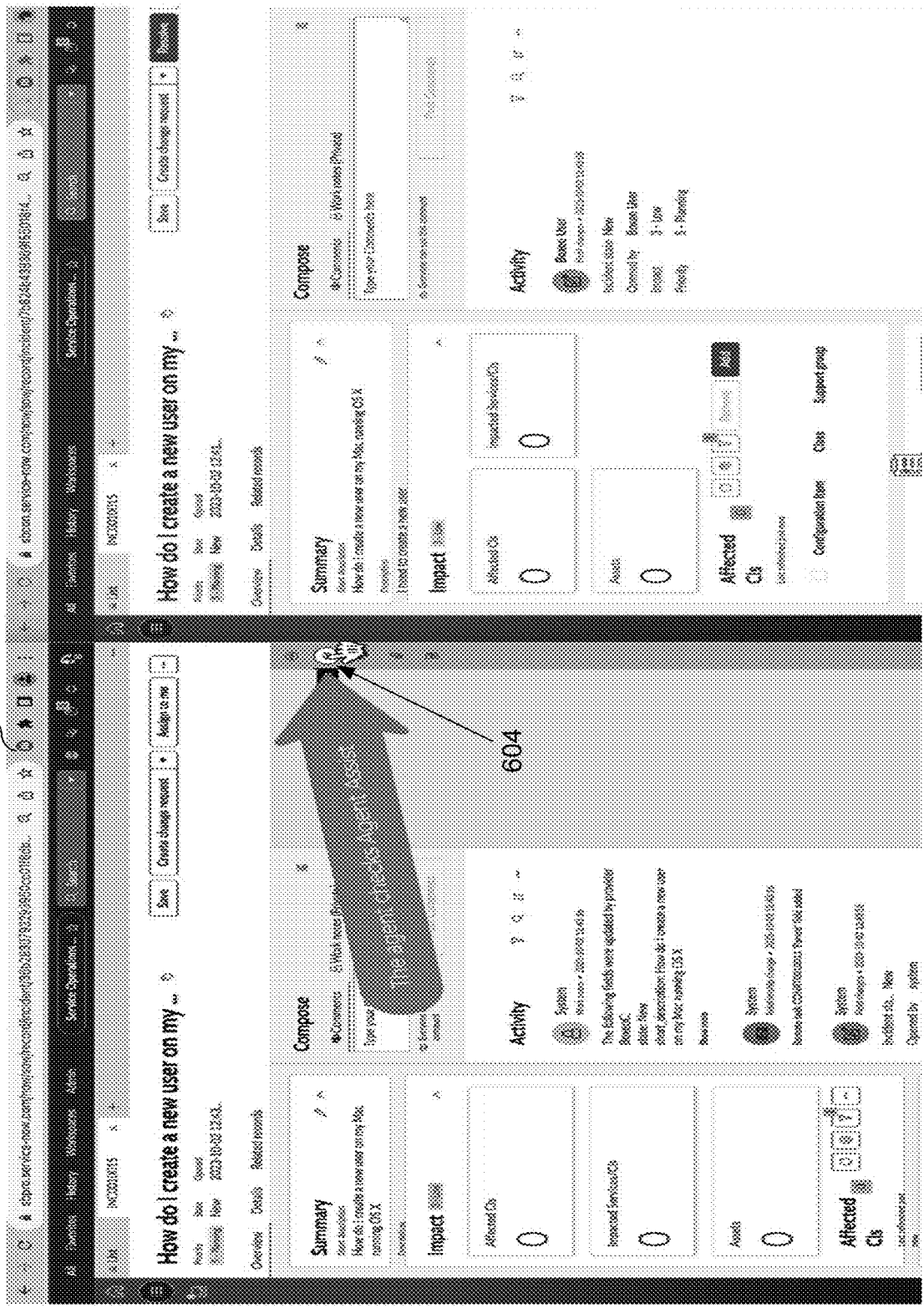
FIG. 6 illustrates the screenshot 602 of the virtual agent opening the feature Agent Assist, which provides a list of resources related to an open record's short description to assist the user in task resolution.

FIG. 6 illustrates the screenshot 602 of the virtual agent opening the feature Agent Assist, which provides a list of resources related to an open record's short description to assist the user in task resolution. Agent Assist for ITSM is preconfigured to assist an agent who is working on an incident or a problem and uses contextual search to search for possible knowledge articles, questions, catalog items, and the like. Clicking the icon 604 in the contextual side panel will display Agent Assist.

Figure 7:
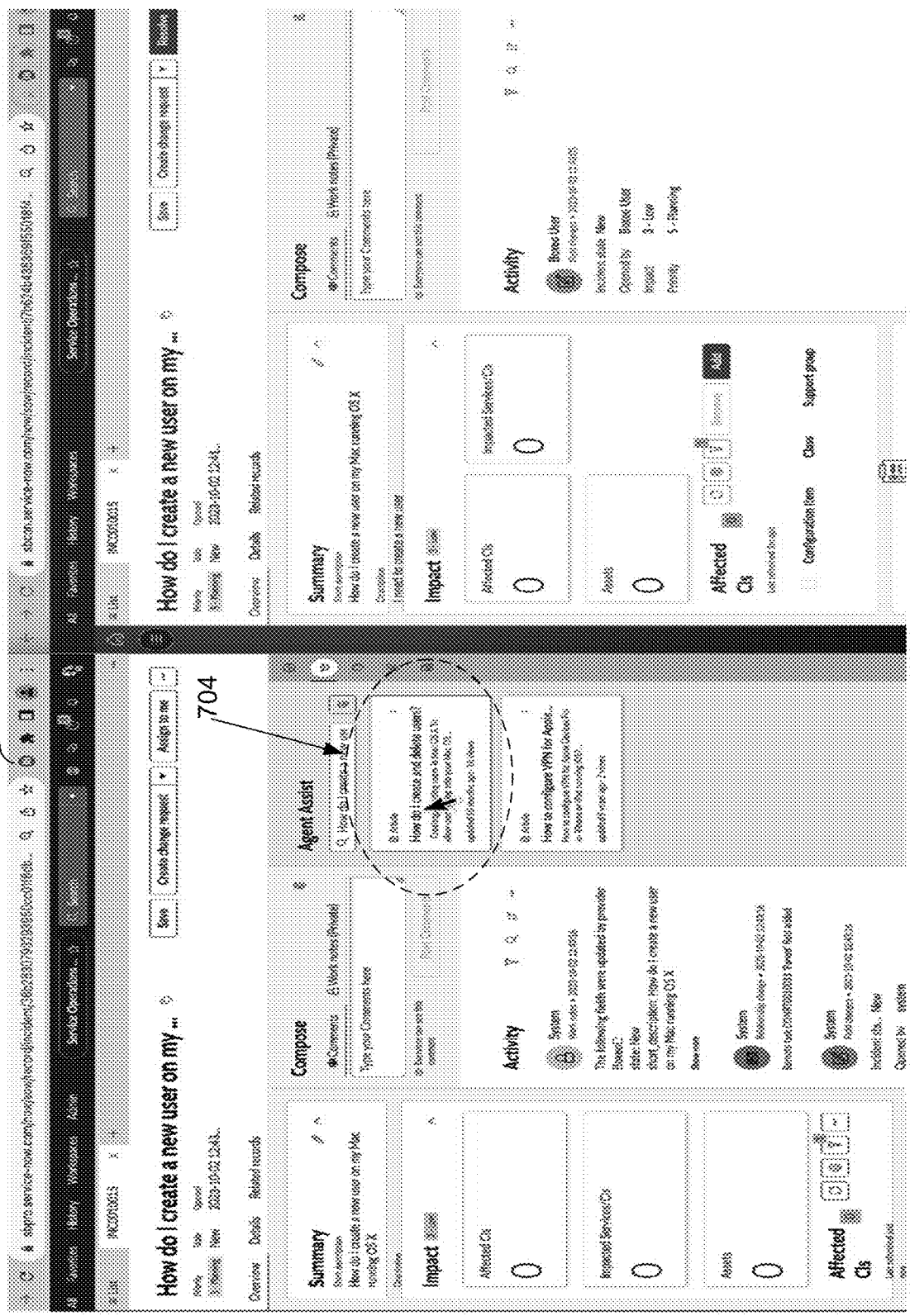
FIG. 7 illustrates the screenshot 702 of the virtual agent locating an article 704 that is relevant to the incident via the Agent Assist feature.
Figure 8:
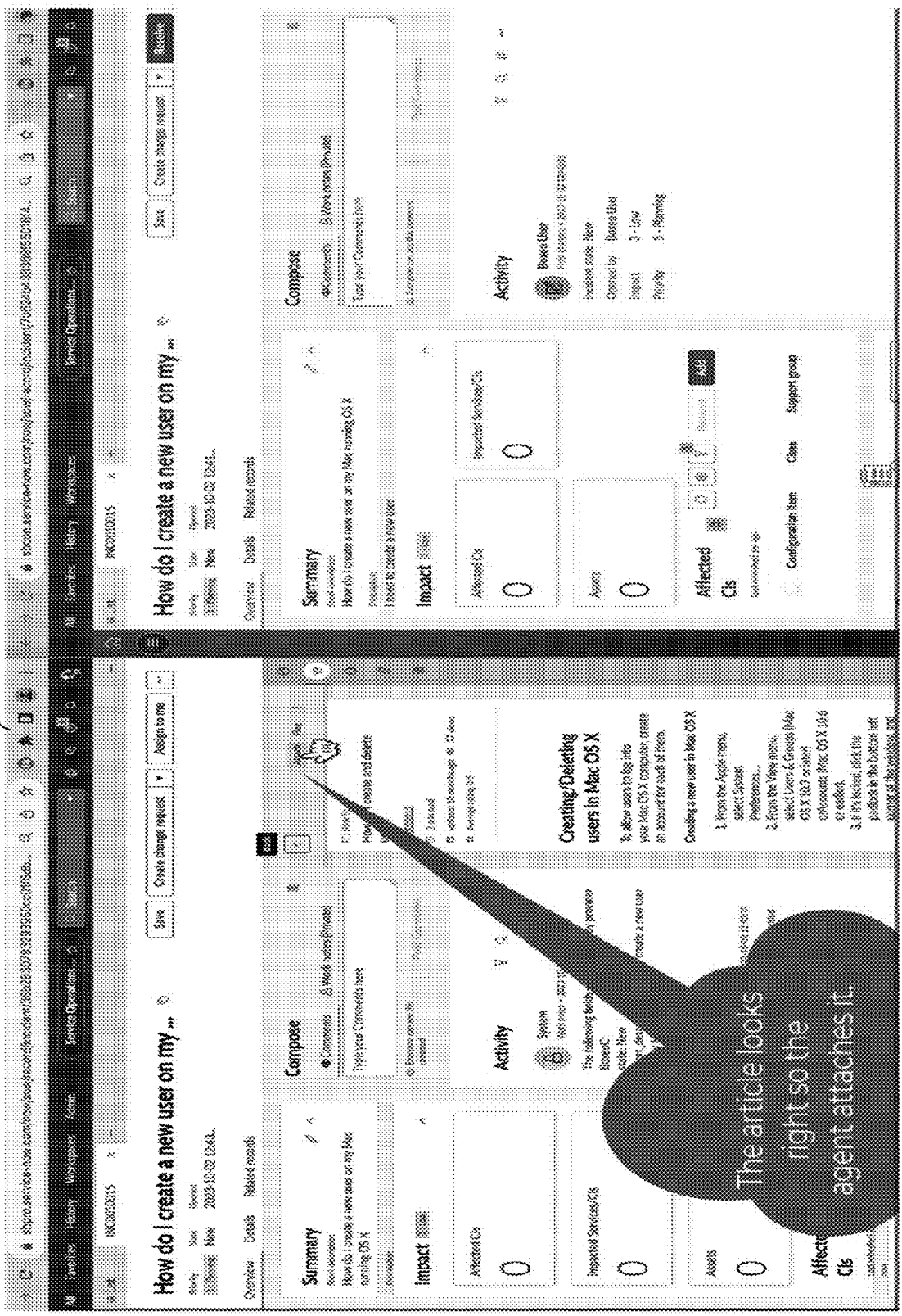
FIG. 8 illustrates the screenshot 802 of the virtual agent attaching the article for the consumer user to see.
Figure 9:
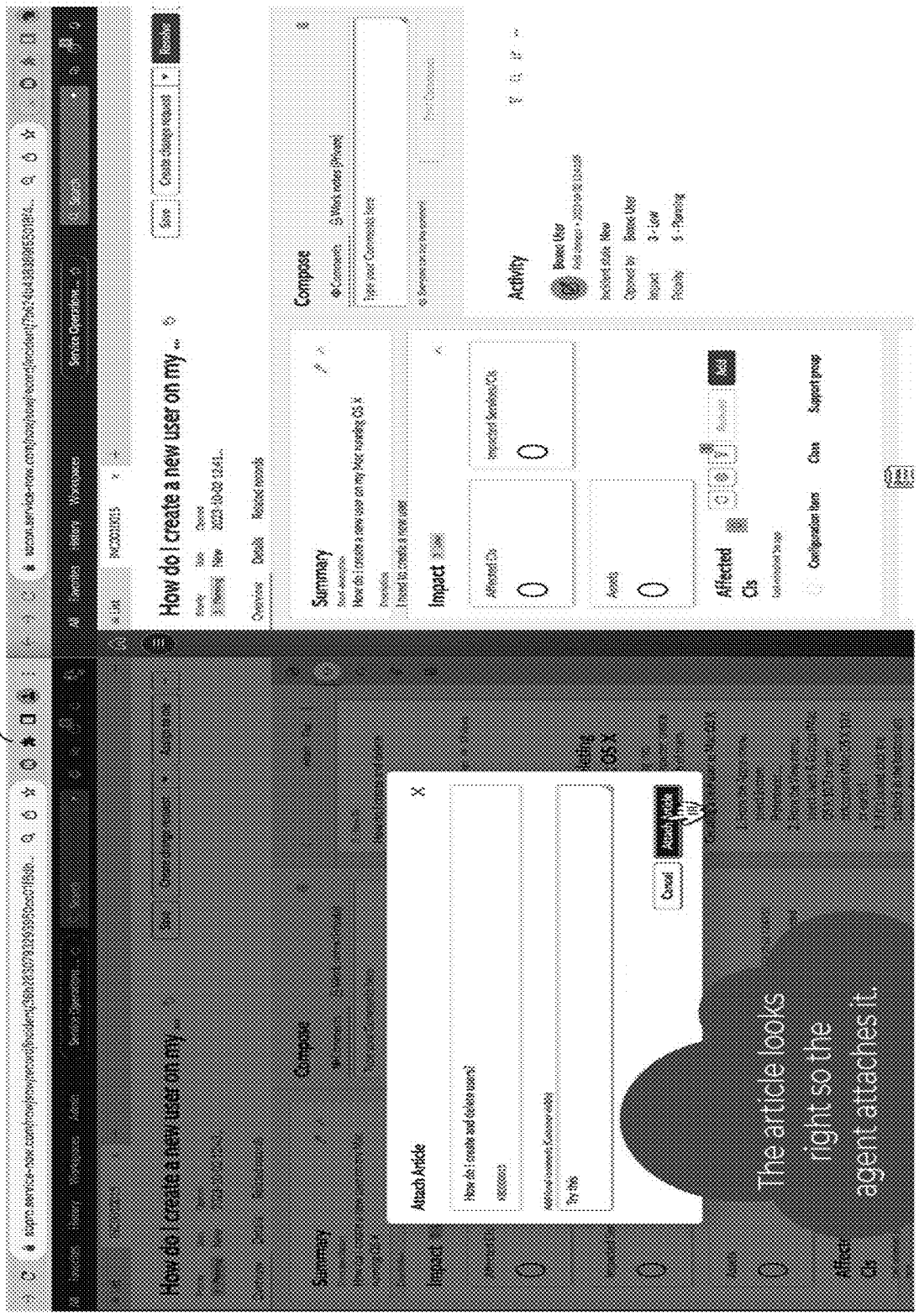
FIG. 9 illustrates the screenshot 902 of the virtual agent attaching the article for the consumer user to see.
Figure 10:
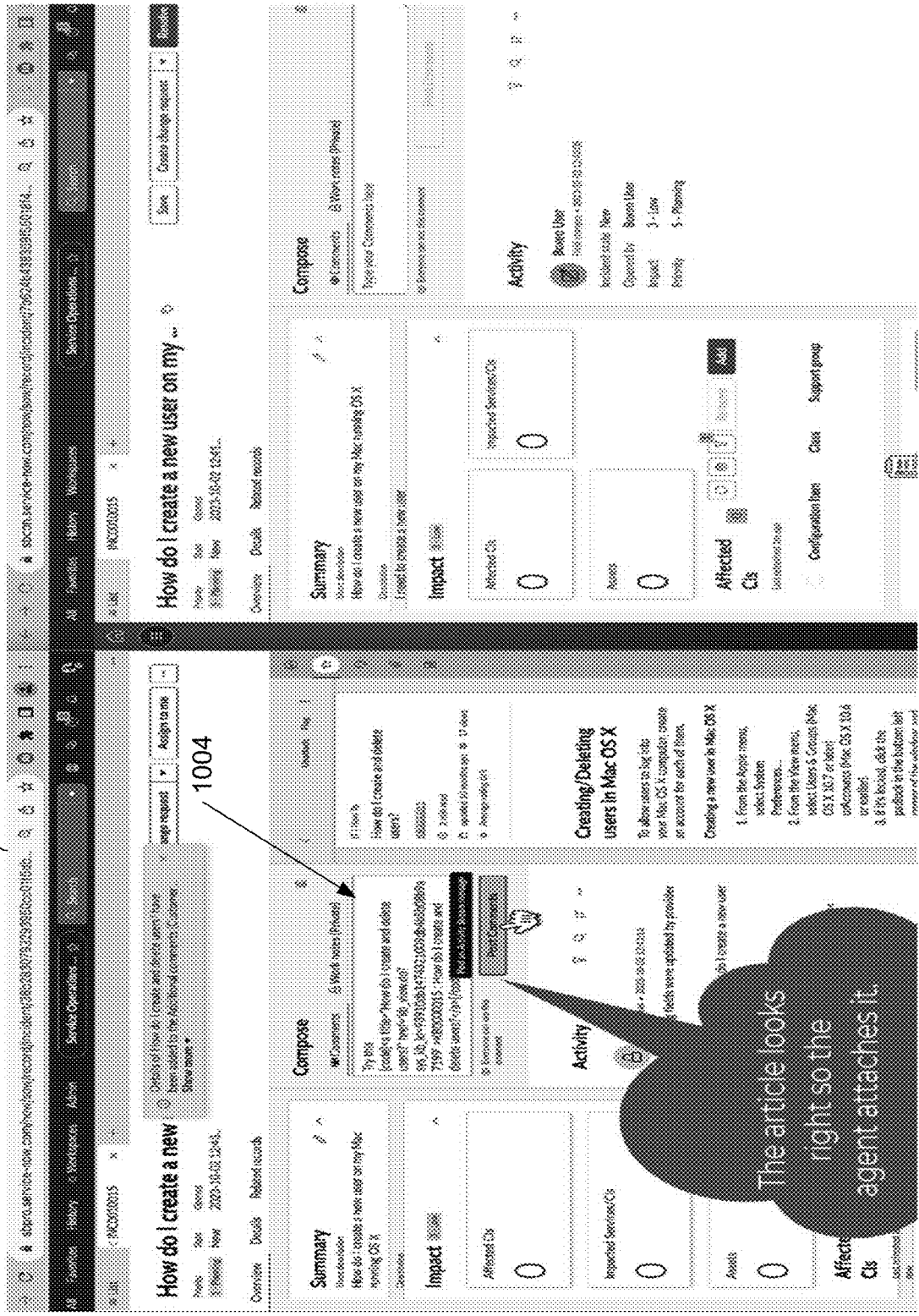
FIG. 10 illustrates the screenshot 1002 of the virtual agent posting a comment, including the message and a link to the relevant article, on a chat user interface 1004.
Figure 11:
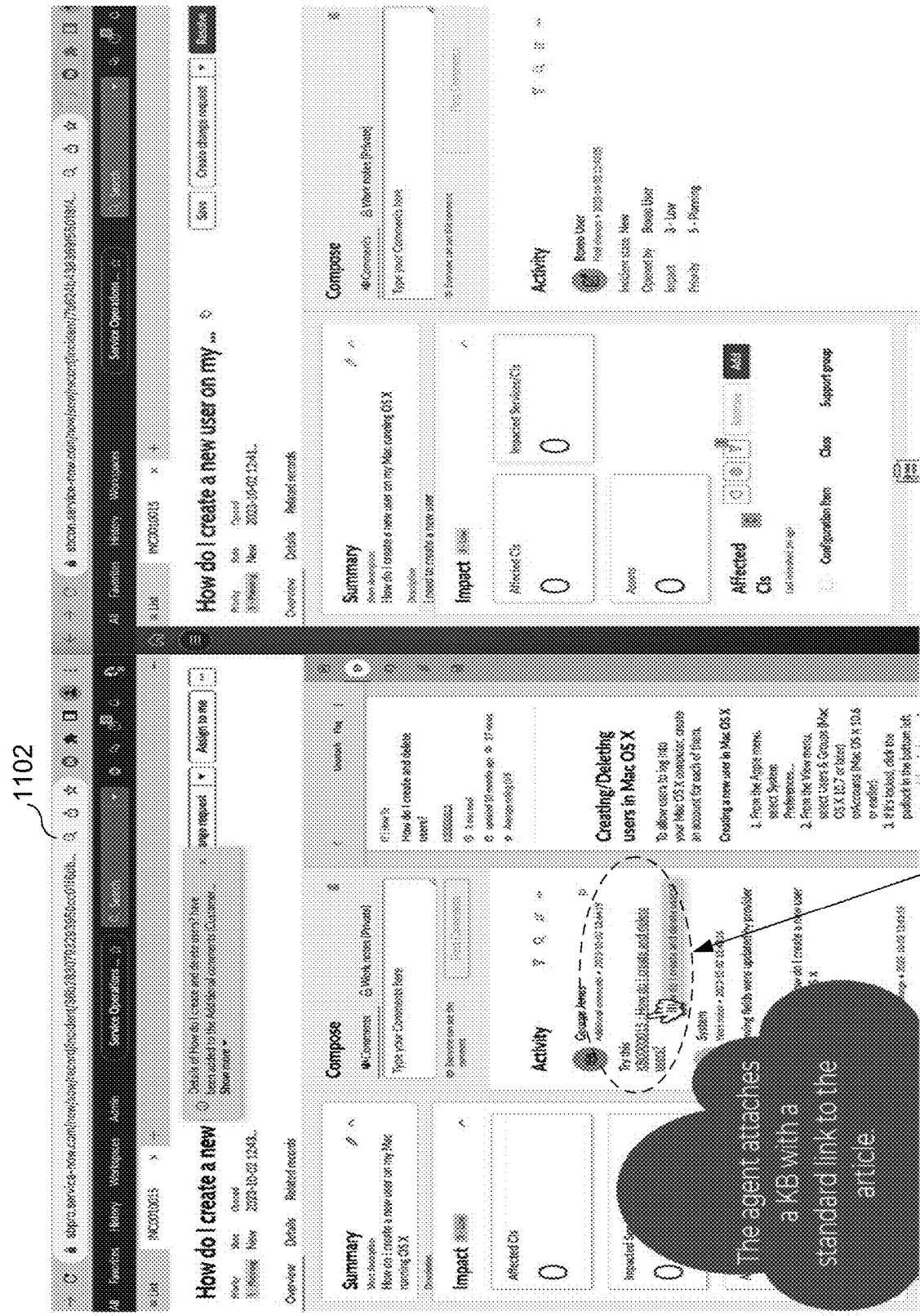
FIG. 11 illustrates the screenshot 1102 showing that a standard link to a KB article and a message (see 1104) have been provided by the virtual agent to the consumer user.
Figure 12:
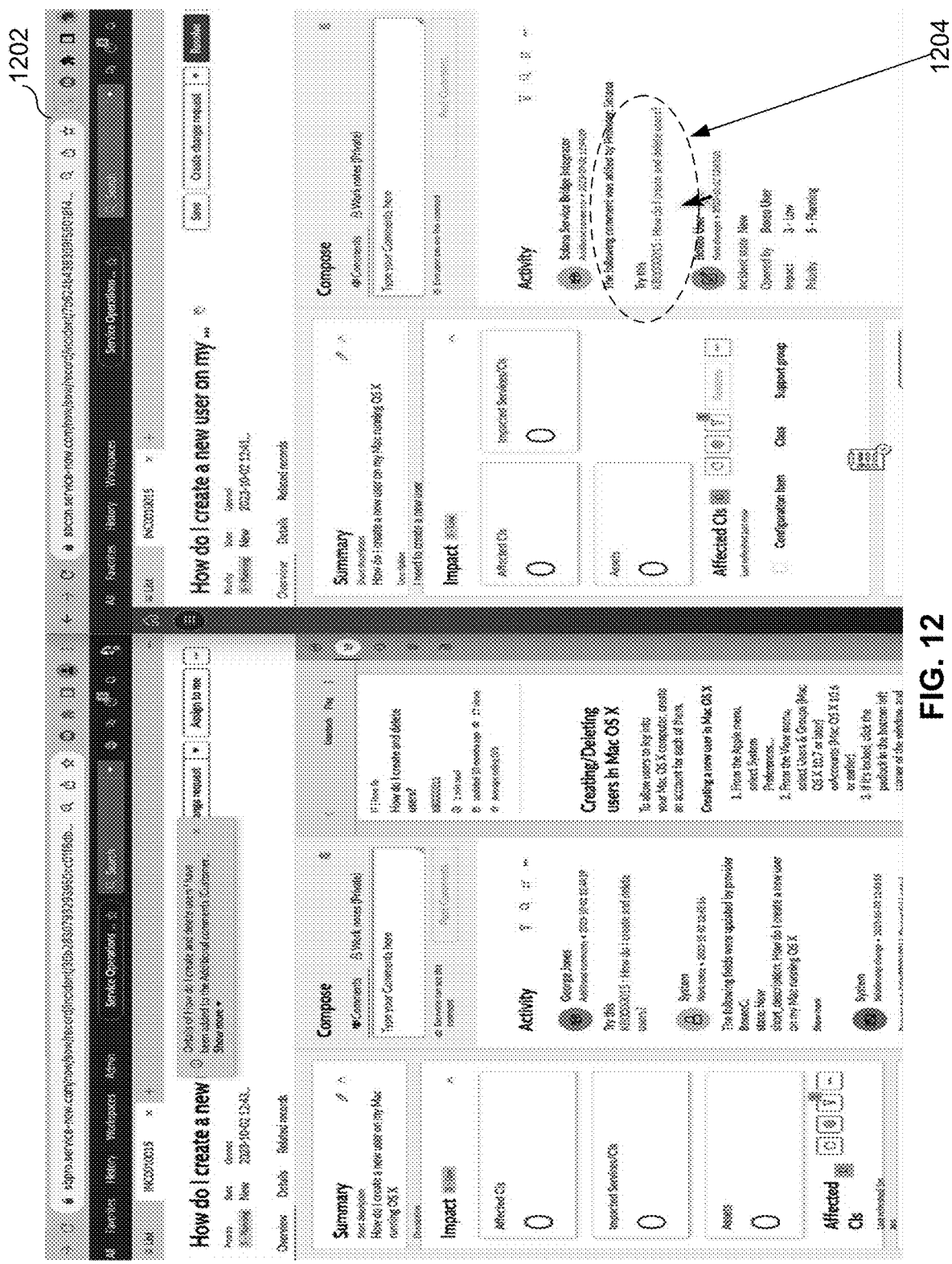
FIG. 12 illustrates the screenshot 1202 showing that a link to the KB article and a message about the link (see 1204) is shown on the consumer user's instance.
Figure 13:
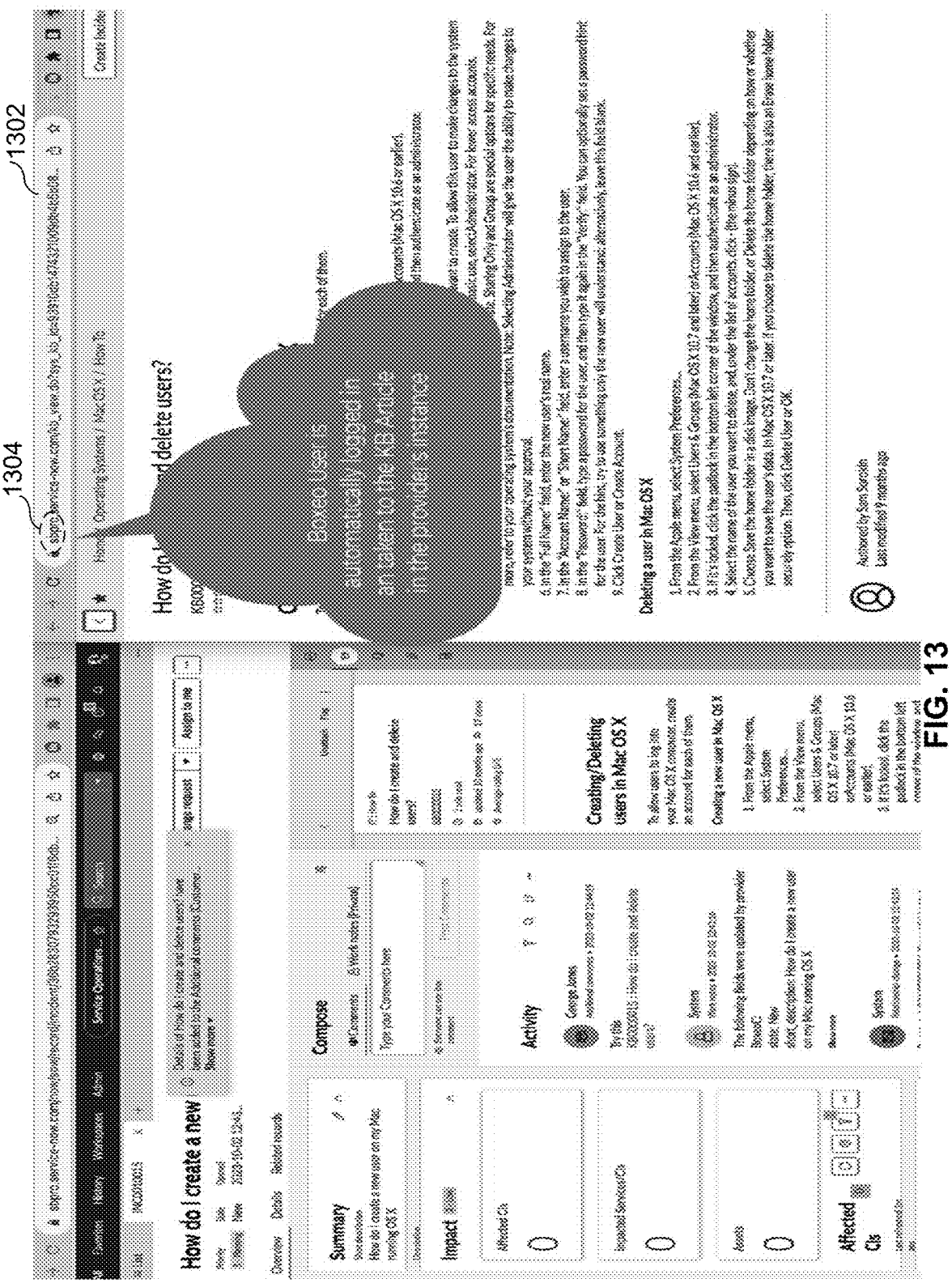
FIG. 13 illustrates the screenshot 1302 showing that the consumer user is automatically logged into the provider's instance (as indicated by "sbpro" 1304) and taken to the KB article in the provider's instance.

FIG. 7 illustrates the screenshot 702 of the virtual agent locating an article 704 that is relevant to the incident via the Agent Assist feature. FIG. 8 illustrates the screenshot 802 of the virtual agent attaching the article for the consumer user to see. FIG. 9 illustrates the screenshot 902 of the virtual agent attaching the article for the consumer user to see. The virtual agent also types the message "Try this" to the consumer user. FIG. 10 illustrates the screenshot 1002 of the virtual agent posting a comment, including the message and a link to the relevant article, on a chat user interface 1004. FIG. 11 illustrates the screenshot 1102 showing that a standard link to a KB article and a message (see 1104) have been provided by the virtual agent to the consumer user. FIG. 12 illustrates the screenshot 1202 showing that a link to the KB article and a message about the link (see 1204) are shown on the consumer user's instance. FIG. 13 illustrates the screenshot 1302 showing that the consumer user is automatically logged into the provider's instance (as indicated by "sbpro" 1304) and taken to the KB article in the provider's instance.

Figure 14:
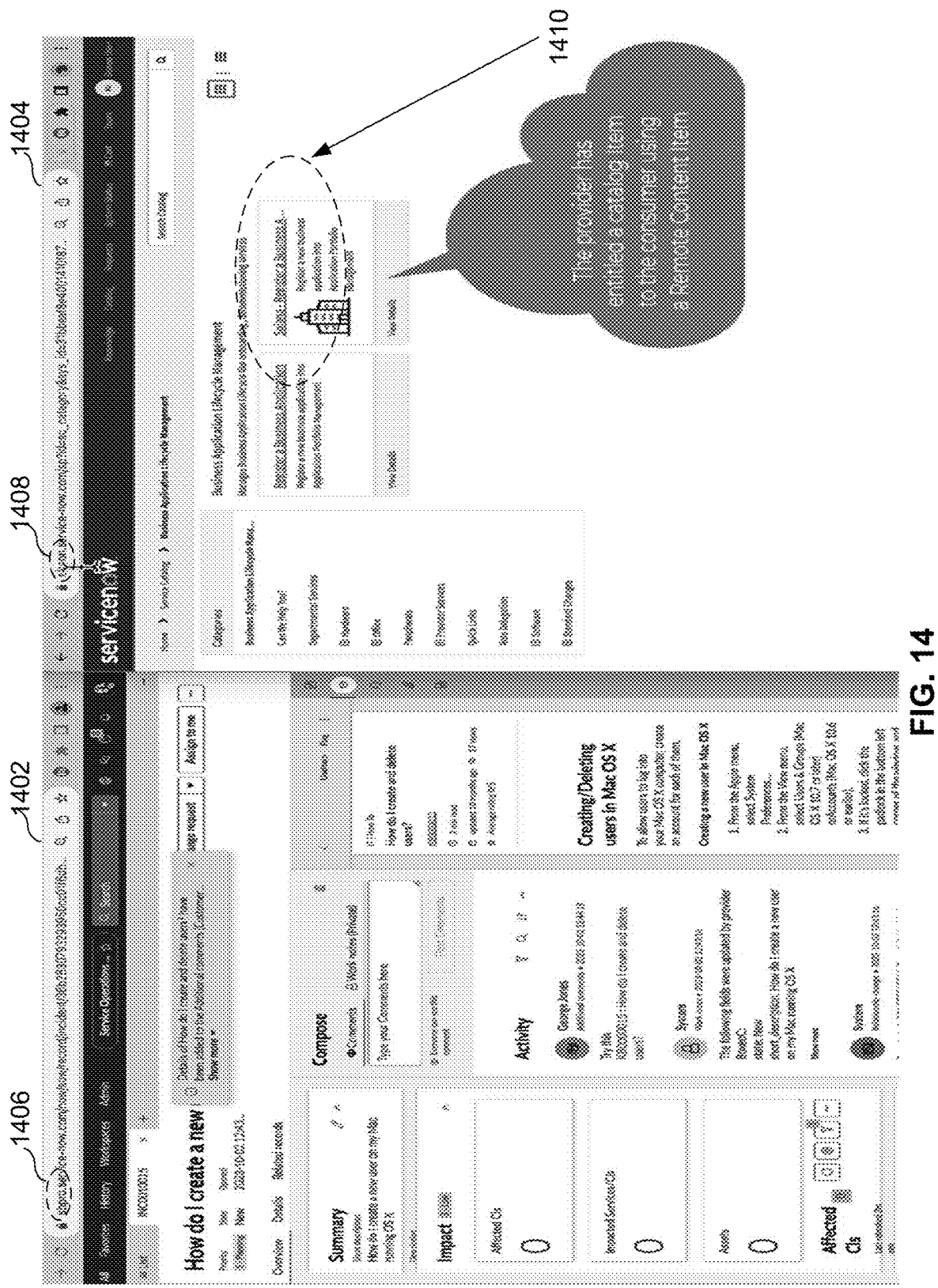
FIG. 14 illustrates the screenshots of a virtual agent communicating and working with a consumer user on an IT issue.
Figure 15:
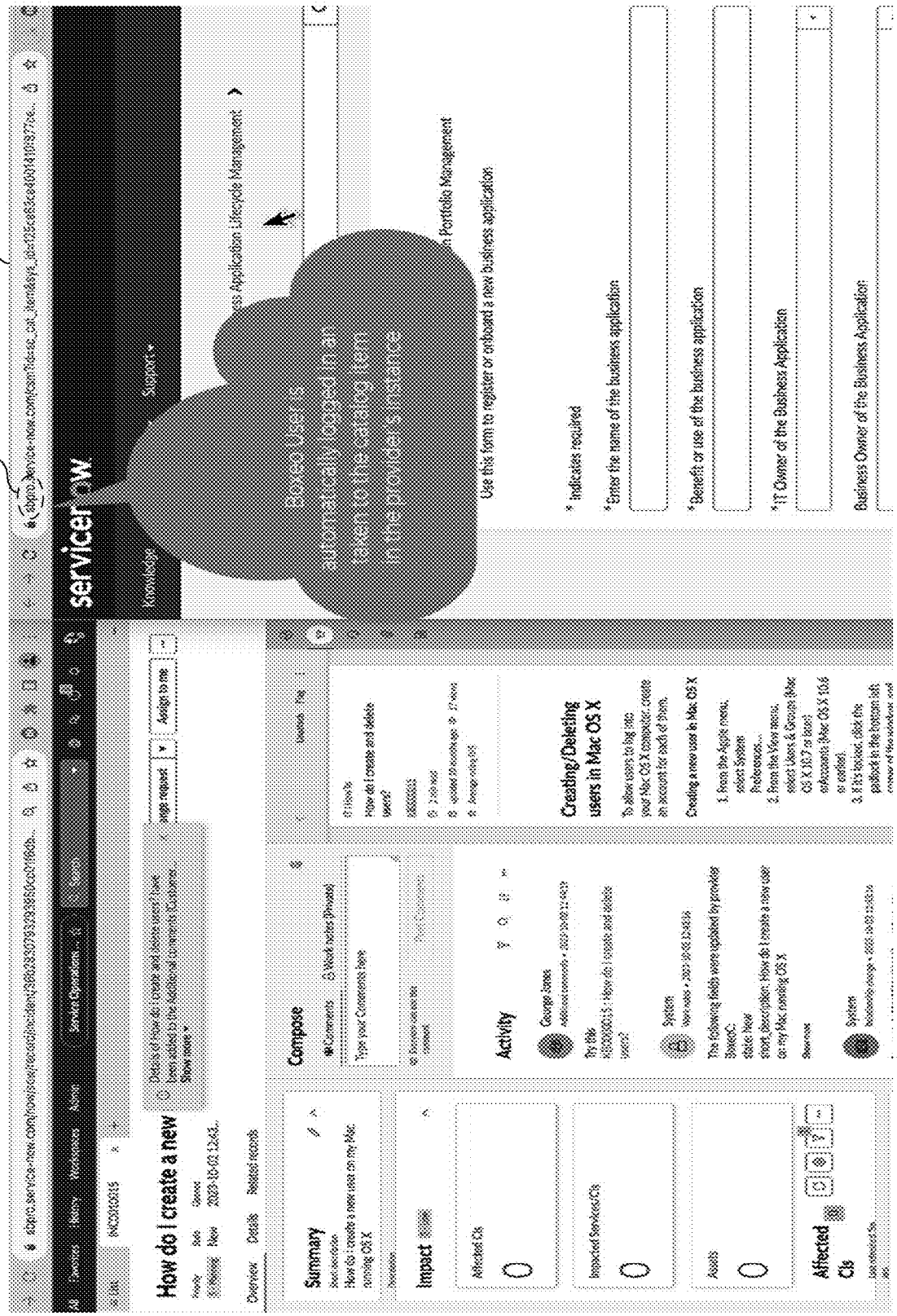
FIG. 15 illustrates the screenshot 1502 showing that the consumer user is automatically logged into the provider's instance (as indicated by "sbpro" 1504) and taken to the catalog item in a new tab in the provider's instance.
Figure 16:
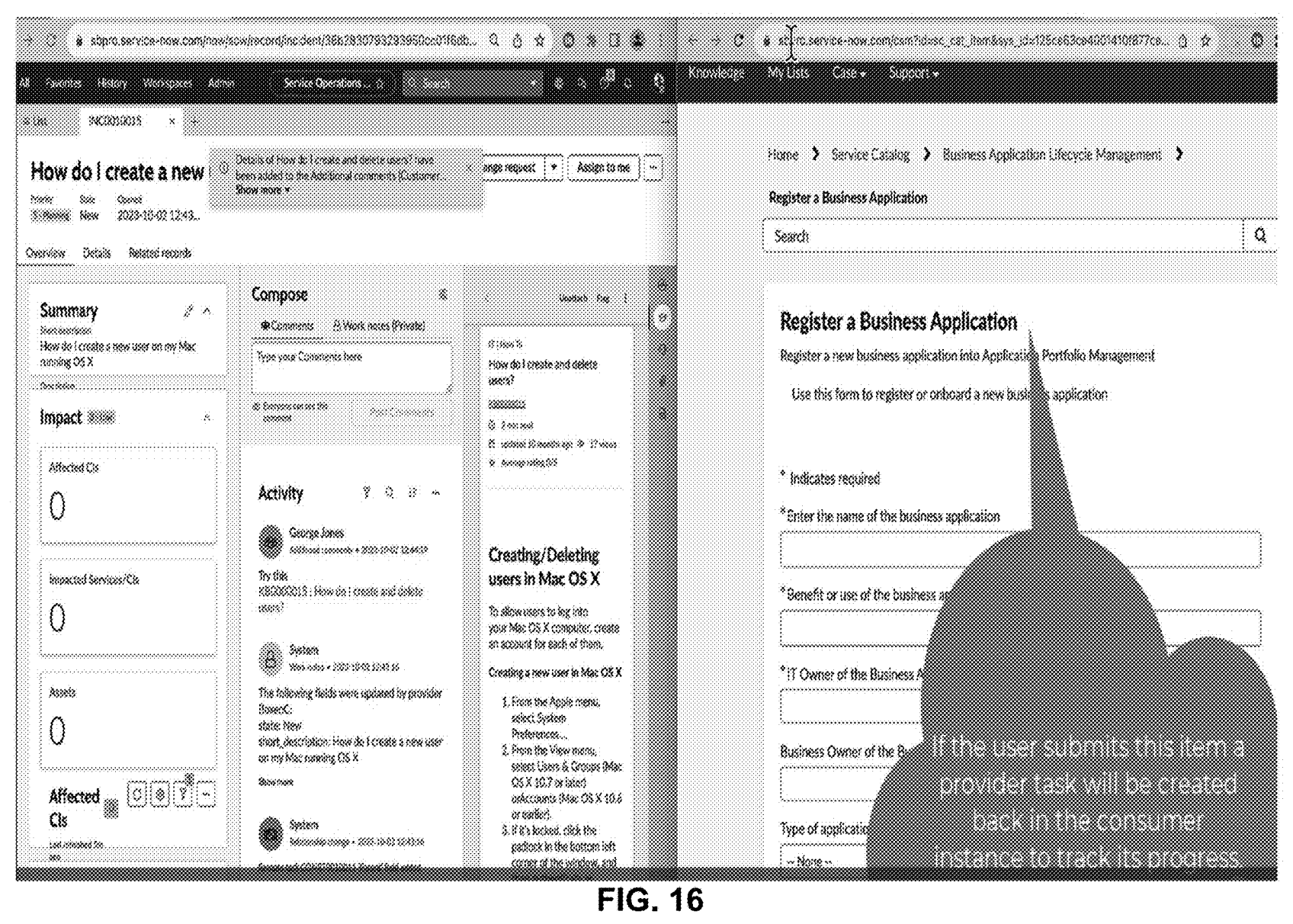

FIGS. 14 to 16 illustrate exemplary screenshots of a second example (Example B) of a virtual agent communicating and working with a consumer user. This particular example is used to illustrate at least some of the steps in process 300. However, it should be recognized that process 300 is not limited to this particular example alone.

FIG. 14 illustrates the screenshots of a virtual agent communicating and working with a consumer user on an IT issue. Screenshot 1402 shows the virtual agent running a provider instance (indicated as "sbpro" 1406) that allows the agent to work with multiple different partners and their associated consumers. Screenshot 1404 shows one of the consumer users working on the service portal and running a consumer instance (indicated as "sbcon" 1408). The service portal has provided a catalog item to the consumer as a remote content item. The regular link on the provider side is automatically converted into a Magic Link 1410 for the consumer user. FIG. 15 illustrates the screenshot 1502 showing that the consumer user is automatically logged into the provider instance (as indicated by "sbpro" 1504) and taken to the catalog item in a new tab in the provider instance. FIG. 16 illustrates that if the consumer user submits the item, then a provider task will be created back in the consumer instance to track its progress.

With reference to FIG. 3, at 306, a standard provider instance link is added to the outbound transport. A provider instance link may include a hyperlink and an associated uniform resource locator (URL). For example, a standard link to the KB article and a message (see 1104) are added to the outbound queue, which receives serialized information or data that is sent from the provider instance to the consumer instance. Once the provider instance link is added to the outbound queue, the provider instance link is sent from the outbound queue to the inbound queue of the consumer instance.

Once the provider instance link is received by the inbound queue, it may be scanned and detected by consumer instance 304. In particular, the text string including the link and the message that is entered by the virtual agent on the chat or comment user interface may be scanned by the consumer instance. Magic Link consumer class 308 is a JavaScript class for creating objects with properties and methods. At 310, using Magic Link consumer class 308, the provider instance links are converted to consumer-side access links in the transport payload. The provider instance links are converted at the transport level.

Alternatively, in some embodiments, the provider instance link is converted by the provider instance to a consumer-side access link before it is transmitted to consumer instance 304. For example, a standard provider instance link is added to the outbound queue. Once the provider instance link is added to the outbound queue, it may be scanned and detected by provider instance 302. In particular, the text string including the link and the message that is entered by the virtual agent on the chat or comment user interface may be scanned by the provider instance. The provider instance link is converted to a consumer-side access link. The provider instance link is sent from the outbound queue to the inbound queue of the consumer instance.

At 312, a consumer-side access link is clicked by a consumer user running consumer instance 304. Using Magic Link consumer class 308, Magic Link consumer-side SSO user interface page 314 on the consumer side performs a number of steps. At 316, the provider connection identification (ID) associated with the provider instance and the active user's authorized user ID associated with the user are obtained for validating the user. Only an authorized user on the ITSM platform is allowed to use the Magic Link. Otherwise, the user will be taken to a page in the consumer instance that displays an error message or tells the user that the user is not authorized to access the provider resource. The advantage is that the provider instance will not be contacted. If the user believes that this is an error, the user may contact the administrator. This step pre-validates on the consumer side the consumer user who clicks the link. The call is validated as coming from a live consumer transport service account. The user is validated as an active/approved authorized user for the consumer connection. It ensures that the consumer user is an active authorized user for this particular provider. Only a consumer instance may request an SSO URL for its user. After the validation, a Magic Link API 318 over on provider instance 302 is called, requesting provider instance 302 to provide a time-based SSO page for accessing the protected resource. The consumer instance passes the authorized user ID and the connection ID to the provider instance.

At 320, on the provider side, the API caller is validated as an active transport service account. At 324, using Magic Link provider class 322, the authorized user ID and the connection ID are validated. Once the consumer user is validated as a valid consumer, a time-based single sign-on (SSO) URL that points to a Magic Link provider-side SSO user interface page 326 on the provider side is returned back to the consumer side (see step 316). In other words, behind the scenes, the service account of the ITSM platform is validating the consumer user and fetching the SSO URL that the consumer user will need to log in. The system uses the active user ID to find the active/approved authorized user record, and there is no manual way for a user to change what is sent because the steps are all behind the scenes on the server side. The provider API uses the authorized user ID to find the active/approved authorized user and validates the connection. If the record matches, then the SSO URL is sent.

Magic Link consumer-side SSO user interface page 314 redirects to Magic Link provider-side SSO user interface page 326 on the provider side. A multi-provider SSO identity provider 328 is provided. At 332, using Magic Link provider SSO class 330, the Magic Link and the user are validated and authenticated. In addition, the consumer user is being redirected to the resource. At 334, the resource is loaded and becomes accessible by the consumer user. In other words, the consumer follows the SSO URL and is authenticated before the resource can be accessed by the consumer. The consumer user is logged in through the browser. The advantage of validating and authenticating on the provider side is that the consumer user will not be taken to a login page and then denied access to a certain resource, which may cause a disconnected user experience. Instead, the consumer will be given access to the resource if the consumer has the proper credentials.

It should be noted that if the consumer user is already authenticated and logged into the provider instance, then a number of steps may be bypassed. Magic Link provider-side SSO user interface page 326 on the provider side checks whether the consumer user is already logged into the provider instance, and if the consumer user is already logged into the provider instance, then the resource may be loaded at 334 and become accessible by the consumer user.

Figure 17:
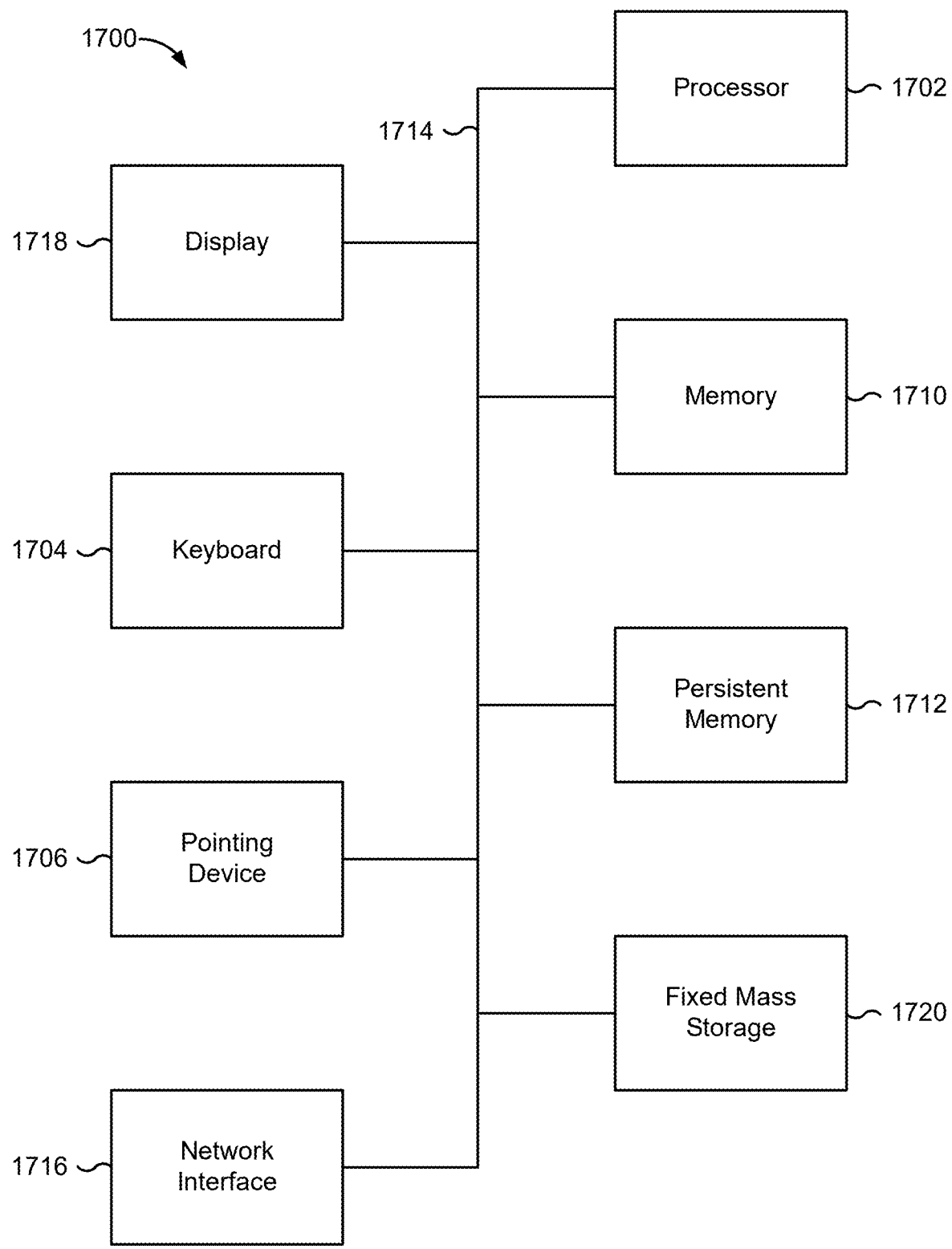
FIG. 17 is a functional diagram illustrating a programmed computer system.

FIG. 17 is a functional diagram illustrating a programmed computer system. In some embodiments, at least parts of process 100 in FIG. 1A, process 150 in FIG. 1B, and process 300 in FIG. 3 are executed by computer system 1700. Computer system 1700 is an example of a processor.

In the example shown, computer system 1700 includes various subsystems as described below. Computer system 1700 includes at least one microprocessor subsystem (also referred to as a processor or a central processing unit (CPU)) 1702. Computer system 1700 can be physical or virtual (e.g., a virtual machine). For example, processor 1702 can be implemented by a single-chip processor or by multiple processors. In some embodiments, processor 1702 is a general-purpose digital processor that controls the operation of computer system 1700. Using instructions retrieved from memory 1710, processor 1702 controls the reception and manipulation of input data, and the output and display of data on output devices (e.g., display 1718).

Processor 1702 is coupled bi-directionally with memory 1710, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1702. Also, as is well known in the art, primary storage typically includes basic operating instructions, program code, data, and objects used by the processor 1702 to perform its functions (e.g., programmed instructions). For example, memory 1710 can include any suitable computer-readable storage media, described below, depending on whether, for example, data access needs to be bi-directional or uni-directional. For example, processor 1702 can also directly and very rapidly retrieve and store frequently needed data in a cache memory (not shown).

Persistent memory 1712 (e.g., a removable mass storage device) provides additional data storage capacity for computer system 1700, and is coupled either bi-directionally (read/write) or uni-directionally (read only) to processor 1702. For example, persistent memory 1712 can also include computer-readable media such as magnetic tape, flash memory, PC-CARDS, portable mass storage devices, holographic storage devices, and other storage devices. A fixed mass storage 1720 can also, for example, provide additional data storage capacity. The most common example of fixed mass storage 1720 is a hard disk drive. Persistent memory 1712 and fixed mass storage 1720 generally store additional programming instructions, data, and the like that typically are not in active use by the processor 1702. It will be appreciated that the information retained within persistent memory 1712 and fixed mass storages 1720 can be incorporated, if needed, in standard fashion as part of memory 1710 (e.g., RAM) as virtual memory.

In addition to providing processor 1702 access to storage subsystems, bus 1714 can also be used to provide access to other subsystems and devices. As shown, these can include a display monitor 1718, a network interface 1716, a keyboard 1704, and a pointing device 1706, as well as an auxiliary input/output device interface, a sound card, speakers, and other subsystems as needed. For example, pointing device 1706 can be a mouse, stylus, track ball, or tablet, and is useful for interacting with a graphical user interface.

Network interface 1716 allows processor 1702 to be coupled to another computer, computer network, or telecommunications network using a network connection as shown. For example, through network interface 1716, processor 1702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1702 can be used to connect computer system 1700 to an external network and transfer data according to standard protocols. Processes can be executed on processor 1702, or can be performed across a network such as the Internet, intranet networks, or local area networks, in conjunction with a remote processor that shares a portion of the processing. Additional mass storage devices (not shown) can also be connected to processor 1702 through network interface 1716.

An auxiliary I/O device interface (not shown) can be used in conjunction with computer system 1700. The auxiliary I/O device interface can include general and customized interfaces that allow processor 1702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 17 is but an example of a computer system suitable for use with the various embodiments disclosed herein. Other computer systems suitable for such use can include additional or fewer subsystems. In addition, bus 1714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   generating, by a first instance, a link to a protected resource;
   converting, in response to determining that the link is being transmitted to a user of a second instance different from the first instance, the link into a transformed link comprising an application programming interface (API) call;
   receiving, in response to the user of the second instance interacting with the transformed link, the API call;
   determining, based on the API call, that the user is authorized to access the protected resource; and
   in response to determining that the user is authorized to access the protected resource, providing to the user of the second instance a uniform resource locator (URL) to access a time-based single sign-on (SSO) page for accessing the protected resource.

2. The method of claim 1, wherein the user of the second instance is provided with the transformed link by the second instance, and wherein interacting with the transformed link comprises clicking the transformed link.

3. The method of claim 1, wherein the second instance is configured to:
   determine a provider connection identification (ID) associated with the first instance and an authorized user ID associated with the user; and
   validate the user based on the provider connection ID and the authorized user ID.

4. The method of claim 3, wherein the second instance is configured to:
   send the API call to the first instance in response to the user being validated based on the provider connection ID and the authorized user ID.

5. The method of claim 3, further comprising:
   receiving the provider connection ID and the authorized user ID from the second instance; and
   validating the user based on the received provider connection ID and the received authorized user ID.

6. The method of claim 5, further comprising:
   determining that the user is authorized to access the protected resource in response to validating the user based on the received provider connection ID and the received authorized user ID.

7. The method of claim 1, further comprising:
   automatically redirecting the user to the time-based SSO page using the provided URL for accessing the protected resource.

8. The method of claim 7, further comprising:
   automatically authenticating the user in response to the user being redirected to the time-based SSO page.

9. The method of claim 8, further comprising:
   automatically logging the user into the first instance in response to the user being authenticated.

10. The method of claim 9, further comprising:
    automatically loading the protected resource for access by the user in response to the user being logged into the first instance.

11. A system, comprising:
    a processor configured to:
       generate, by a first instance, a link to a protected resource;
       convert, in response to determining that the link is being transmitted to a user of a second instance different from the first instance, the link into a transformed link comprising an application programming interface (API) call;

receive, in response to the user of the second instance interacting with the transformed link, the API call;

determine, based on the API call, that the user is authorized to access the protected resource; and in response to determining that the user is authorized to access the protected resource, provide to the user of the second instance a uniform resource locator (URL) to access a time-based single sign-on (SSO) page for accessing the protected resource; and a memory coupled to the processor and configured to provide the processor with instructions.

12. The system of claim 11, wherein the user of the second instance is provided with the transformed link by the second instance, and wherein interacting with the transformed link comprises clicking the transformed link.

13. The system of claim 11, wherein the second instance is configured to:

determine a provider connection identification (ID) associated with the first instance and an authorized user ID associated with the user; and validate the user based on the provider connection ID and the authorized user ID.

14. The system of claim 13, wherein the second instance is configured to:

send the API call to the first instance in response to the user being validated based on the provider connection ID and the authorized user ID.

15. The system of claim 13, wherein the processor is configured to:

receive the provider connection ID and the authorized user ID from the second instance; and validate the user based on the received provider connection ID and the received authorized user ID.

16. The system of claim 15, wherein the processor is configured to:

determine that the user is authorized to access the protected resource in response to validating the user based on the received provider connection ID and the received authorized user ID.

17. The system of claim 11, wherein the processor is configured to:

automatically redirect the user to the time-based SSO page using the provided URL for accessing the protected resource.

18. The system of claim 17, wherein the processor is configured to:

automatically authenticate the user in response to the user being redirected to the time-based SSO page;

automatically log the user into the first instance in response to the user being authenticated; and automatically load the protected resource for access by the user in response to the user being logged into the first instance.

19. A computer program product, the computer program product being embodied in a non-transitory computer readable medium and comprising computer instructions for:

generating, by a first instance, a link to a protected resource;

converting, in response to determining that the link is being transmitted to a user of a second instance different from the first instance, the link into a transformed link comprising an application programming interface (API) call;

receiving, in response to the user of the second instance interacting with the transformed link, the API call;

determining, based on the API call, that the user is authorized to access the protected resource; and in response to determining that the user is authorized to access the protected resource, providing to the user of the second instance a uniform resource locator (URL) to access a time-based single sign-on (SSO) page for accessing the protected resource.

\* \* \* \* \*